Jan. 19, 1965  A. E. SMOLL ETAL  3,165,934
ACCELEROMETER

Filed July 30, 1962  4 Sheets-Sheet 1

INVENTORS
ALLEN E. SMOLL
WEYMAN. S. CROCKER

BY Claude Funkhouser

ATTORNEY

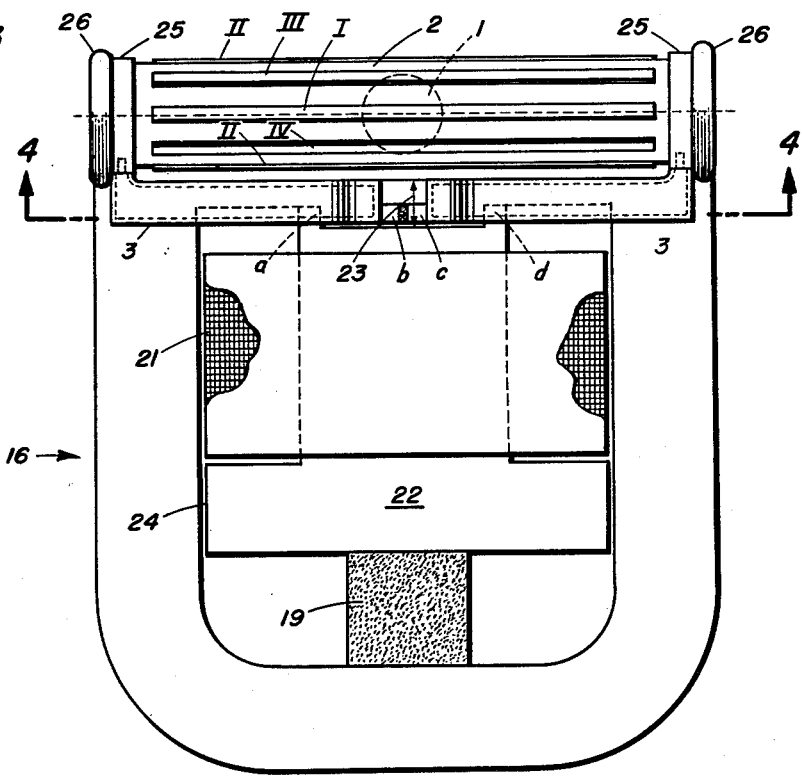
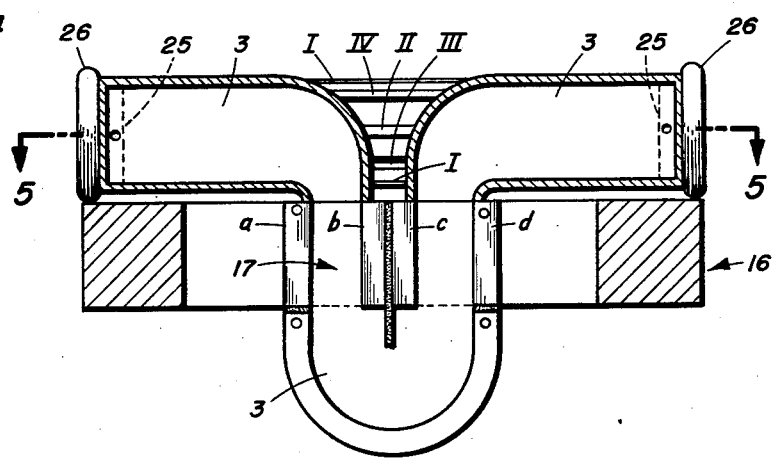

Jan. 19, 1965 A. E. SMOLL ETAL 3,165,934

ACCELEROMETER

Filed July 30, 1962 4 Sheets-Sheet 3

Jan. 19, 1965     A. E. SMOLL ET AL     3,165,934
ACCELEROMETER
Filed July 30, 1962                4 Sheets-Sheet 4

United States Patent Office

3,165,934
Patented Jan. 19, 1965

3,165,934
ACCELEROMETER
Allen E. Smoll, Palo Alto, Calif., and Weyman S. Crocker, Lynnfield Center, Mass., assignors, by mesne assignments, to the United States of America as represented by the Secretary of the Navy
Filed July 30, 1962, Ser. No. 213,559
4 Claims. (Cl. 73—516)

The present invention relates to an apparatus for measuring acceleration. More particularly, this invention relates to an accelerometer wherein the movement of a seismic mass supported within a housing is correlated to the acceleration of a body.

One difficulty in providing an apparatus for measuring acceleration having a seismic mass located within a housing to be accelerated is that of supporting the seismic mass within the housing in such a manner so as not to introduce errors in the instrument.

Another difficulty is that of providing a suitable means for translating the movement of the seismic mass into a suitable form to indicate acceleration of the body.

Several proposals have been made for supporting the seismic mass.

One of the proposals has been to support the mass by means of elastic cantilever beams or diaphragms. However, two serious disadvantages of this method of support is that the dynamic range of the instruments is quite limited and the null force of the elastic member is unpredictable.

Another proposal for supporting the seismic mass has been that of using passive lubrication. Although this means of support may be satisfactory for rapid vibration indicators, where the accelerator is essentially nonvarying or high traverse components are present, the lubrication fails and high coulomb friction levels are experienced.

Although electromagnetic suspension may eliminate some of the disadvantages of the above support means, it introduces several serious problems. For example, the support means is quite large and the magnetic inhomogeneities in the materials used cause appreciable uncertainties in the operation of the device.

Forced lubrication methods of supporting the seismic mass can prevent actual physical control of the element rendering the apparatus useless.

Rotating the support member to center the seismic mass introduces inaccuracies in the measurement of acceleration and increases the size of the apparatus beyond that desired. This support means also limits the performance life of the apparatus by necessitating the use of bearings and their accompanying structure to achieve rotation of the support member.

Therefore, it is an object of this invention to provide an apparatus for measuring the acceleration of a body.

It is a further object of this invention to provide an apparatus for measuring the acceleration of a body wherein a seismic mass is supported within a housing and the movement of the mass is correlated to the acceleration of the body.

A further object of this invention is to provide an accelerometer wherein a seismic mass is freely supported within a housing in such a manner as to eliminate static friction between the mass and the housing while at the same time avoiding inaccuracies introduced into the apparatus by the support means.

A further object of this invention is to provide an accelerometer which is small in size and compact.

A further object of this invention is to provide an accelerometer having a minimum number of moving parts.

A further object of this invention is to provide an accelerometer wherein a seismic mass is freely supported within a housing and having a means to accurately correlate the movement of the mass to the acceleration of a body in which the mass is located.

A further object of this invention is to provide an accelerometer wherein acceleration is converted into digital pulses from an analog signal thereby obtaining greater accuracy.

Other objects and many of the attendant advantages of this invention will be readily appreciated as the same becomes better understood by reference to the following detailed description when considered in connection with the accompanying drawings wherein:

FIG. 3 is a plan view of the accelerometer assembly shown in FIG. 2;

FIG. 4 is a transverse vertical section view of a part of the accelerometer assembly taken along line 4—4 of FIG. 3;

Figure 7A:
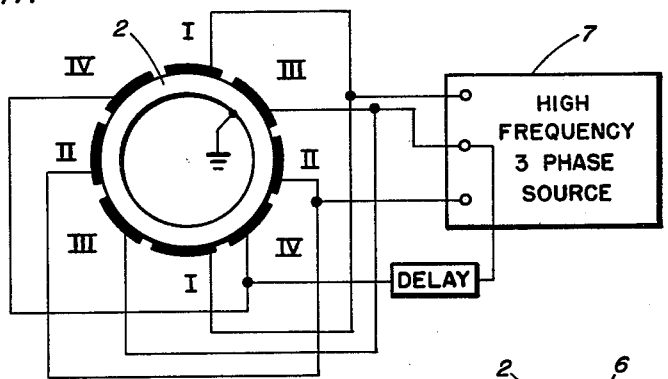
Figure 7B:
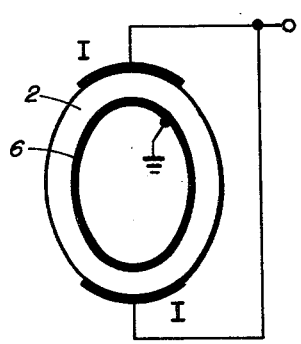
Figure 7C:
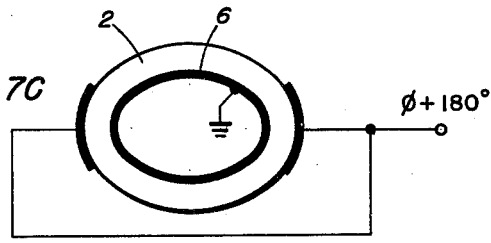

FIGS. 7a–c are schematic diagrams of the vibrating action of the housing.

Figure 8A:
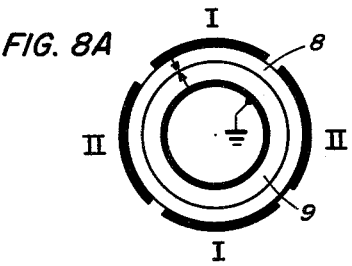
Figure 8C:
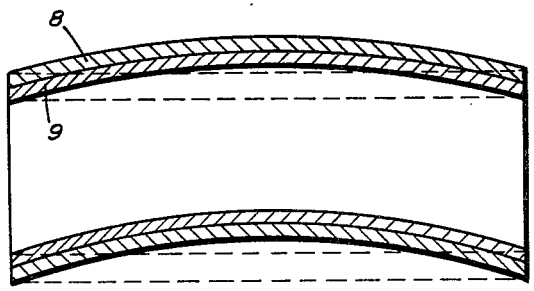
Figure 8B:
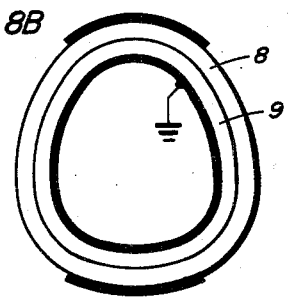

FIGS. 8a–c are schematic diagrams of a modification of the housing.

Figure 1:
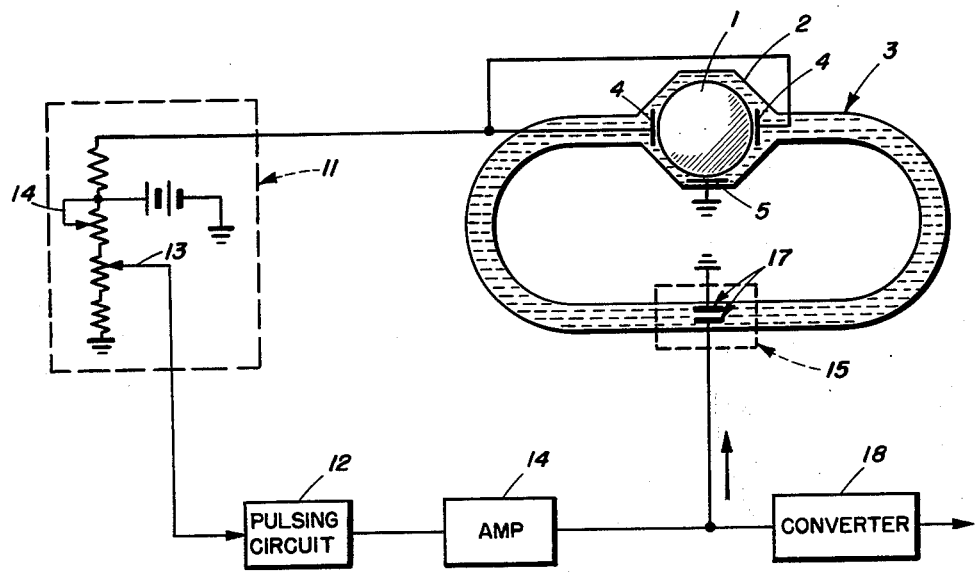
FIG. 1 is a schematic diagram of the accelerometer.

Reference may now be made to FIG. 1 which shows a schematic diagram of the accelerometer assembly. A seismic mass 1 is supported in a fluid filled housing 2. A conduit 3 connects the ends of the housing and is filled with fluid of the same type as that within the housing 2. In the preferred embodiment of this invention, the seismic mass 1 is of a quartz material and is spherical in cross-section while the housing 2 is of quartz or similar material and is cylindrical in cross-section. These particular materials and configurations are chosen for convenience only and should not be taken to limit the scope of the invention.

Located within the housing 2 and spaced from the seismic mass 1 are electrodes 4 and 5 for detecting the position of the seismic mass 1. The fluid within the housing 2 and conduits 3 is electrically conductive in the preferred embodiment of the invention shown in FIG. 1 and changes in resistance in the housing with movement of the seismic mass. A suitable fluid for this purpose is mercury.

It is necessary to the successful operation of the accelerometer that the seismic mass 1 be freely supported within housing 2 so that it is free to move in either direction along the longitudinal axis of the housing under the respective forces of the acceleration of the body within which the apparatus is situated and the restoring force to be hereinafter described. It is also necessary to the successful operation of this invention that the seismic element 1 be supported within housing 2 so that it does not come in contact with the inside surface of the housing and thereby generate static coulomb friction. On the other hand, seismic mass 1 must be spaced sufficiently close to the inside walls of the housing 2 to minimize leakage around the seismic mass 1.

The above mentioned support of the seismic mass 1 in housing 2 is achieved by a particular rotating vibration of the housing which is aptly termed a "skipping the rope" vibration. Although the "skipping the rope" vibration is the preferable vibrational means of supporting the seismic mass 1, it should be understood that other means such as vibrating the housing axially or a "dithering" action may be used to support the seismic mass 1 within housing 2. One of the primary reasons necessitating a floating support for the seismic mass is that in the absence of any such support any imperfection on the mass in contact with the housing would increase the friction to such an extent as to render the instrument inaccurate.

In the "skipping the rope" type of vibration the housing 2 is caused to vibrate in a plane perpendicular to its longitudinal axis, and this vibration is rotated in the same plane so that the portion of the inside wall of the housing that is vibrated moves closely adjacent the seismic mass 1. Since the vibration is rotated around the circumference of the housing, the inside wall of the housing approaches the outside surface of the seismic mass at all points on the surface, which in the preferred embodiment is a sphere, the locus of which lies on a center cross-section of the sphere taken in a plane perpendicular to the longitudinal axis of the housing. The motion of the wall of the housing 2 toward the seismic mass 1 acting on the viscous fluid within the housing, "pulls" the fluid into the narrowed region between the seismic mass 1 and the housing wall. A sizeable pressure can be created thereby, and the seismic mass is supported out of contact with the housing. This support is maintained around the seismic mass due to the rotation of the vibration as discussed above.

Two means of achieving the rotational vibration of the housing are schematically illustrated in FIGS. 7a–c and 8a–c.

The housing 2 shown in FIGS. 7a–c is of quartz or a similar material such as PZT–5 ceramic that deforms when subjected to a high frequency voltage. The outside of the housing 2 is plated with pairs of elongated electrodes having Roman numerals I–IV spaced in pairs opposite each other around the circumference of the housing 2. A continuous electrode 6 is plated on the inside surface of the housing 2. Voltage is applied to the pairs of electrodes successively around the circumference of the housing by a high frequency three-phase source 7. When voltage is applied to each pair of electrodes, that portion of the material under the electrode shrinks while the same portion of the material elongates circumferentially. At an instant 180° out of phase with the first occurrence a positive voltage is applied to the electrode II situated at 90° around the circumference of the housing from electrode I. Electrode III and electrode IV are excited 90° electrically out of phase with the first two pairs. In this manner, and by applying voltages on each pair of plates of the proper phase angle and magnitude, the housing may be distorted into an elliptical shape which can be made to rotate.

A modification of housing 2 is shown in FIGS. 8a–c. In this modification the vibration is achieved by means known as the "bimorph" principle. In this modification two tubes 8 and 9 are poled in opposite, radial directions and then assembled in a rigid, concentric configuration. The tube 8 has electrodes plated on its outer surface similar to FIG. 7 except that there are only four segments. FIG. 8b is an end view which shows how the tube will deform. The upper side under the electrode will have less curvature and the other side will become more rounded. The shearing action induced along the parting line of the two concentric tubes will cause the composite tube to buckle along its axis as shown in FIG. 8c. The combined motions will tend to support the seismic mass 1 when the field is rotated. The rotation of the electric field is accomplished as previously explained with reference to FIGS. 7a–c.

Referring again to FIG. 1, it can be seen that the electrical resistance between electrodes 4 and 5 forms one arm of a resistance measuring circuit such as that generally designated as 11. The movement of the seismic mass 1 due to the force of acceleration causes a change in the resistance of the fluid between the electrodes 4 and 5. Since the resistance measuring circuit 11 is balanced to produce no output current when seismic mass 1 is in a steady-state position, a change in resistance between electrodes 4 and 5 due to movement of seismic mass 1 will produce an unbalance current in resistance measuring circuit 11 which unbalance current is fed into a pulsing circuit 12 from potentiometer pickoff 13. The resistance measuring circuit is initially balanced by shorting arm 14, and the pulsing circuit 12 is zeroed by potentiometer pickoff 13. The unbalance signal from resistance measuring circuit 11 controls the frequency of output pulses from pulsing circuit 12. The output pulses are amplified by amplifier 14 and are fed into an electromagnetic pressure generator designated generally as 15.

The principle of pressure generator 15 is the same as that of a D.C. motor. A magnetic field is established through the conducting fluid in conduit 3 by magnet 16. The pulses from amplifier 14 pass between electrodes 17 through the conducting fluid in a direction transverse to the magnetic field. A pressure is generated on the fluid and is transmitted via conduit 3 to the seismic mass 1. The pressure on the fluid is directly related to the frequency of pulses out of pulsing circuit 11 which are in turn directly related to the position of the seismic mass 1 from its steady-state position. The fluid restores the seismic mass 1 to its null position. For steady conditions the acceleration and the pressure forces exactly balance and the seismic mass 1 is held stationary with respect to its null position. The frequency of the input pulses to the fluid pump 15 which established the force balance can be converted into a measure of acceleration by converter 18.

Figure 2:
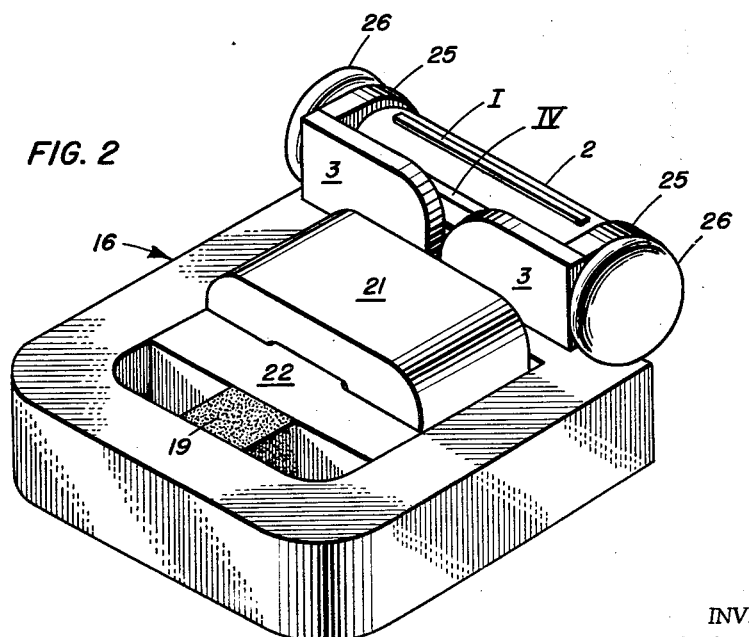
FIG. 2 is a perspective view of the accelerometer assembly with the readout portion absent.

One embodiment of the accelerometer shown in FIG. 1 can be seen by reference to FIGS. 2–4. The seismic mass 1 is supported within fluid filled housing 2. The support is achieved by rotational vibration of housing 2 by means of electrode pairs I–IV and high frequency three phase source 7 as previously discussed. Housing 2 is filled with an electrically conductive fluid and communicates with the electromagnetic pump by means of conduit 3. Magnet 16 is composed of a permanent magnet 19, compensating coil 21 and soft iron core members 22. The magnetic flux through working gap 23 is produced by the compensating coil 21 and permanent magnet 19. Shunt gap 24 reduces the magnetic reluctance of the compensating flux path thereby obtaining a compromise between the compensating coil and the permanent magnet. The conduit 3 is connected into the housing 2 by a mounting 25, while housing 2 is secured in position by a boss 26 extending through mounting 25.

Figure 5:
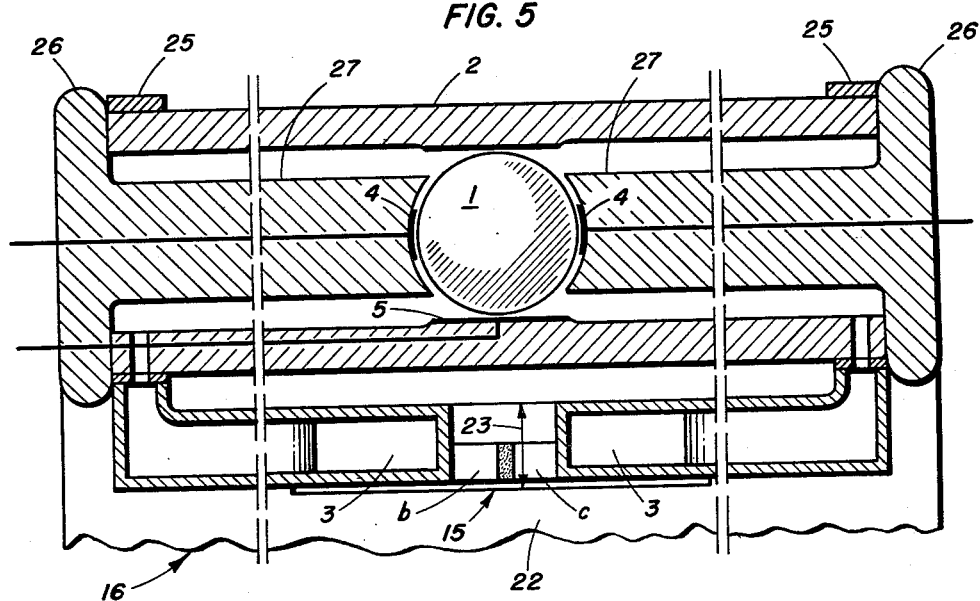
FIG. 5 is a plan section view of a part of the accelerometer assembly showing the housing, the seismic mass, the conduits and the position detector electrodes taken along lines 5—5 of FIG. 4.

The relative positions of housing, seismic mass, conduit and pick-off electrode are best shown in FIG. 5. Seismic mass 1 moves between pick-off electrodes 4 along the longitudinal axis of housing 2 in response to acceleration of a body to which the accelerometer is attached. The change of resistance between one of the electrodes on the projections 27 and the grounded electrode 5 on the inside surface of housing 2 causes an unbalance of circuit 11 which causes a change of the frequency of the pulses into fluid pump 15 changing the pressure on the fluid in conduit 3 to restore seismic mass 1 to its steady state position.

Figure 6:
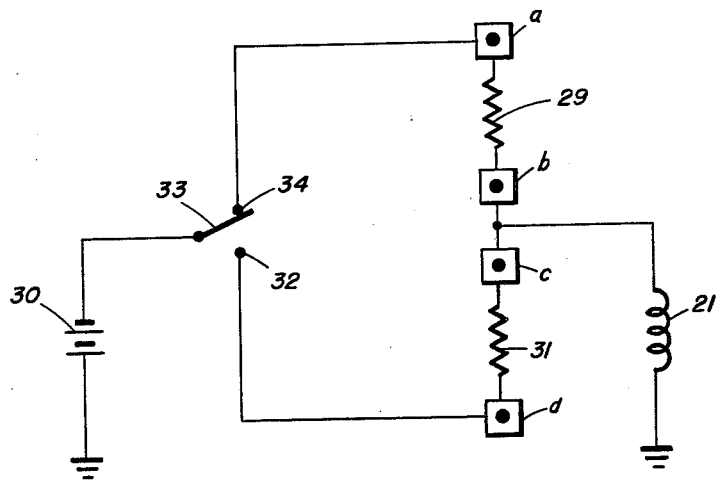
FIG. 6 is a schematic diagram of the electric circuit of the fluid pump assembly.

The electrical circuit through the conducting fluid is established by electrodes 17, lettered a, b, c and d, while the electrical circuit of the pump is shown schematically in FIG. 6. The resistors 29 and 31 indicate the resistance of the fluid between electrodes a, b, c and d respectively. The compensating coil 21 is connected between electrodes b and d. The purpose of the compensating coil is to cancel errors in the pressure produced by fluid pump 15 due to inaccuracies in the magnetic field around the fluid in the conduit 3 due to the pulses through the fluid. Switch 33 is merely a simplified showing of the pulsing system represented in FIG. 1 by block diagrams 12 and 14 while 30 is a constant current source representing constant amplitude pulses put into the fluid pump circuit. The frequency of the switching action of switch 33 between contacts 34 and 32 represent the frequency of the constant amplitude pulses, which frequency is controlled in the pulsing circuit by the change in ressistance of the fluid within the housing 2 due to movement of seismic mass 1. The frequency of the pulses into the fluid pump controls the pressure generated by the pump 15. As the acceleration of the body to which the accelerometer is attached increases, the frequency of the output pulses from pulsing circuit 12 increases, causing the frequency of pulses into fluid pump 15 to increase, which in turn increases the fluid pressure in conduit 3 to restore seismic mass 1 to its steady-state position. Converter 18 changes the pulse signal into an indication of the acceleration of the body. The use of a digital system to indicate acceleration e.g., that having acceleration indicated in terms of pulse frequency in a D.C. force transducer provides an accelerometer capable of achieving much greater accuracy than previous analog accelerometers.

Obviously, many modifications and variations of the present invention are possible in the light of the above teachings. It is, therefore, to be understood that within the scope of the appended claims the invention may be practiced otherwise than as specifically described.

What is claimed is:

1. In an apparatus for measuring the acceleration of a body, the combination comprising
   a hollow housing cylindrical in cross section;
   fluid located within said housing;
   a solid seismic mass, spherical in shape, freely floating within the fluid for movement in response to acceleration of the body;
   a plurality of electrodes spaced around the circumference of said housing and forming a portion thereof, said electrodes being energized in pairs so as to vibrate the walls of the housing in a plane transverse to its longitudinal axis;
   phase shift means to apply potential sequentially to the pairs of electrodes so as to rotate the vibration about the longitudinal axis of the housing and therefore the fluid within the housing;
   pick-off means located within said housing for detecting movement of the seismic mass;
   restoring means operably connected to said pick-off means for returning said seismic mass to its steady-state position; and
   read-out means operably connected to said pick-off means for converting the indication of movement of said seismic mass into a measure of the acceleration of the body.

2. An accelerometer as described in claim 1 wherein said fluid is electrically conductive.

3. An accelerometer as described in claim 2 wherein said pick-off means includes electrodes located on either side and below the seismic mass, responsive to a change in resistance between the electrodes due to movement of the seismic mass and fluid within the housing for producing a current directly related to the movement of said seismic mass.

4. An accelerometer as described in claim 3 further including
   a pulsing circuit operably connected to the electrodes responsive to the change in resistance of said electrically conductive fluid for producing pulses having a constant amplitude and a frequency directly related to the current;
   a conduit connected at each of its ends with said housing and filled with the electrically conductive fluid for transmitting pressure generated by the restoring means to the fluid in the housing; and
   where the restoring means comprises at least one pair of electrodes spaced on opposite sides and integral with the conduit for conducting the pulses through said fluid in said conduit, and a magnet adjacent the conduit for creating a magnetic field through the fluid in said conduit in a direction transverse to the direction of flow of said pulses to thereby generate a force on the fluid within the conduit proportional to the movement of the seismic mass for restoring the seismic mass to its steady-state position.

References Cited by the Examiner

UNITED STATES PATENTS

| | | | |
|---|---|---|---|
| 2,165,894 | 7/39 | Hohndorf | 73—515 |
| 2,677,270 | 5/54 | Sanderson | 73—515 |
| 2,713,726 | 7/55 | Dixson | 33—206.5 |
| 2,797,912 | 7/57 | Trostler | 73—516 |
| 2,834,215 | 5/58 | Deer | 338—44 |
| 2,943,493 | 7/60 | Bosch | 73—516 |
| 2,963,285 | 12/60 | Fisher | 73—516 |
| 2,978,910 | 4/61 | Aske | 73—515 |
| 2,988,920 | 6/61 | Lees | 73—516 |
| 2,993,739 | 7/61 | Hall | 308—1 |
| 3,005,665 | 10/61 | Thomson | 73—514 |
| 3,029,644 | 4/62 | Loveless et al. | 73—516 |
| 3,121,336 | 2/64 | Riordan | 73—516 |
| 3,132,520 | 5/64 | Wing | 73—516 |

RICHARD C. QUEISSER, *Primary Examiner.*

ROBERT L. EVANS, *Examiner.*